United States Patent
Cherian et al.

(10) Patent No.: US 9,154,990 B2
(45) Date of Patent: Oct. 6, 2015

(54) METHOD TO DROP PACKETS SELECTIVELY IN PACKET DATA NETWORKS

(71) Applicant: Qualcomm Incorporated, San Diego, CA (US)

(72) Inventors: George Cherian, San Diego, CA (US); Jun Wang, San Diego, CA (US); Suli Zhao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 243 days.

(21) Appl. No.: 13/842,950

(22) Filed: Mar. 15, 2013

(65) Prior Publication Data

US 2014/0036679 A1    Feb. 6, 2014

Related U.S. Application Data

(60) Provisional application No. 61/680,150, filed on Aug. 6, 2012.

(51) Int. Cl.
| | |
|---|---|
| *G01R 31/08* | (2006.01) |
| *H04W 28/02* | (2009.01) |
| *H04L 12/823* | (2013.01) |
| *H04L 12/851* | (2013.01) |

(52) U.S. Cl.
CPC ........... *H04W 28/0263* (2013.01); *H04L 47/32* (2013.01); *H04L 47/24* (2013.01)

(58) Field of Classification Search
USPC ................. 370/401, 235, 252, 329, 349, 216
See application file for complete search history.

(56) References Cited

U.S. PATENT DOCUMENTS

| | | | |
|---|---|---|---|
| 6,647,424 B1 | 11/2003 | Pearson et al. | |
| 7,848,237 B2 | 12/2010 | Todd et al. | |
| 2005/0041631 A1 | 2/2005 | Aerrabotu et al. | |
| 2007/0266430 A1 | 11/2007 | Babbar et al. | |
| 2008/0019275 A1 | 1/2008 | Mudireddy et al. | |
| 2012/0182859 A1* | 7/2012 | Ikeda et al. | 370/216 |
| 2014/0254396 A1* | 9/2014 | Hilton et al. | 370/250 |

OTHER PUBLICATIONS

3rd Generation Partnership Project 2 "3GPP2", cdma2000 Wireless IP Network Standard: Quality of Service and Header Reduction, 3GPP2 X.S0011-004-E, v1.0, Nov. 2009. pp. 1-82.

(Continued)

*Primary Examiner* — Phuongchau Ba Nguyen
(74) *Attorney, Agent, or Firm* — Ke Liu

(57) ABSTRACT

A method, an apparatus, and a computer program product for wireless communication are provided. The apparatus receives information from a network for discarding a data packet, identifies a data packet to be transmitted, determines whether the identified data packet is associated with at least one packet filter of a traffic flow template (TFT), and discards the identified data packet based on whether the identified data packet is associated with the at least one packet filter of the TFT. In an aspect, the apparatus identifies a data packet to be transmitted, determines whether the data packet is associated with at least one packet filter of the TFT, deactivates a link flow associated with the data packet based on whether the data packet is associated with the at least one packet filter of the TFT, and provides information to a device to discard the data packet associated with the deactivated link flow.

85 Claims, 14 Drawing Sheets

(56) References Cited

OTHER PUBLICATIONS

3GPP2 Draft; 1146766311_1-7-05, 3rd Generation Partnership Project 2, 3GPP2, 2500 Wilson Boulevard, Suite 300, Arlington, Virginia 22201; USA vol. TSGX Jan. 13, 2005, pp. 1-44, XP062098830, Retrieved from the Internet: URL: http://ftp.3gpp2.org/TSGX/Working/2005/2005-01/TR45.6-2005-01-Vancouver/2005011016 TIA-835-D Ballot comments/ [retrieved on Jan. 13, 2005] paragraph [0016] paragraphs [0148] - [0152] paragraph [0175].

International Search Report and Written Opinion—PCT/US2013/053869—ISA/EPO—Nov. 8, 2013.

* cited by examiner

METHOD TO DROP PACKETS SELECTIVELY IN PACKET DATA NETWORKS

CROSS-REFERENCE TO RELATED APPLICATION(S)

This application claims the benefit of U.S. Provisional Application Ser. No. 61/680,150, entitled "METHOD TO DROP PACKETS SELECTIVELY IN PACKET DATA NETWORKS" and filed on Aug. 6, 2012, which is expressly incorporated by reference herein in its entirety.

BACKGROUND

1. Field

The present disclosure relates generally to communication systems, and more particularly, to selectively discarding packets to be transmitted in a packet data network.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. Emerging telecommunication standards are designed to better support mobile broadband Internet access by improving spectral efficiency, lower costs, improve services, make use of new spectrum, and better integrate with other open standards using, for example, OFDMA on the downlink (DL), SC-FDMA on the uplink (UL), and multiple-input multiple-output (MIMO) antenna technology. However, as the demand for mobile broadband access continues to increase, there exists a need for further improvements. Preferably, these improvements should be applicable to other multi-access technologies and the telecommunication standards that employ these technologies.

SUMMARY

In an aspect of the disclosure, a method, a computer program product, and an apparatus are provided. The apparatus identifies a data packet to be transmitted, determines whether the identified data packet is associated with at least one packet filter of a traffic flow template (TFT), and discards the identified data packet based on whether the identified data packet is associated with the at least one packet filter of the TFT.

In another aspect of the disclosure, the apparatus identifies a data packet to be transmitted, determines whether the data packet is associated with at least one packet filter of a traffic flow template (TFT), deactivates a link flow associated with the data packet based on whether the data packet is associated with the at least one packet filter of the TFT, and provides information to a device to discard the data packet associated with the deactivated link flow.

In a further aspect of the invention, the apparatus receives first information from a core network for discarding a data packet, identifies a link flow associated with the data packet, transmits second information for deactivating the identified link flow; and discards the identified data packet based on whether the identified data packet is associated with at least one packet filter of a traffic flow template (TFT).

DETAILED DESCRIPTION

Figure 1:
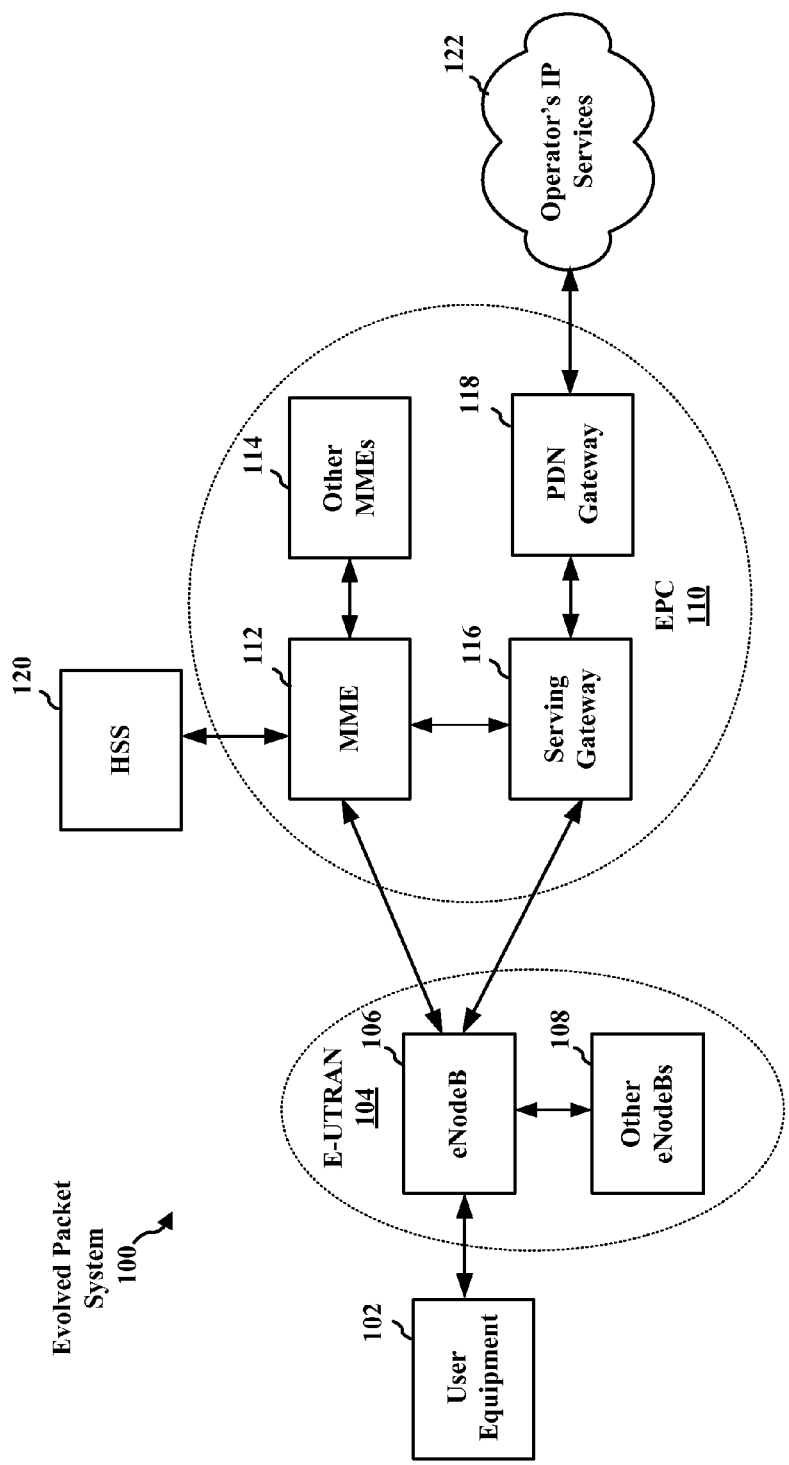
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
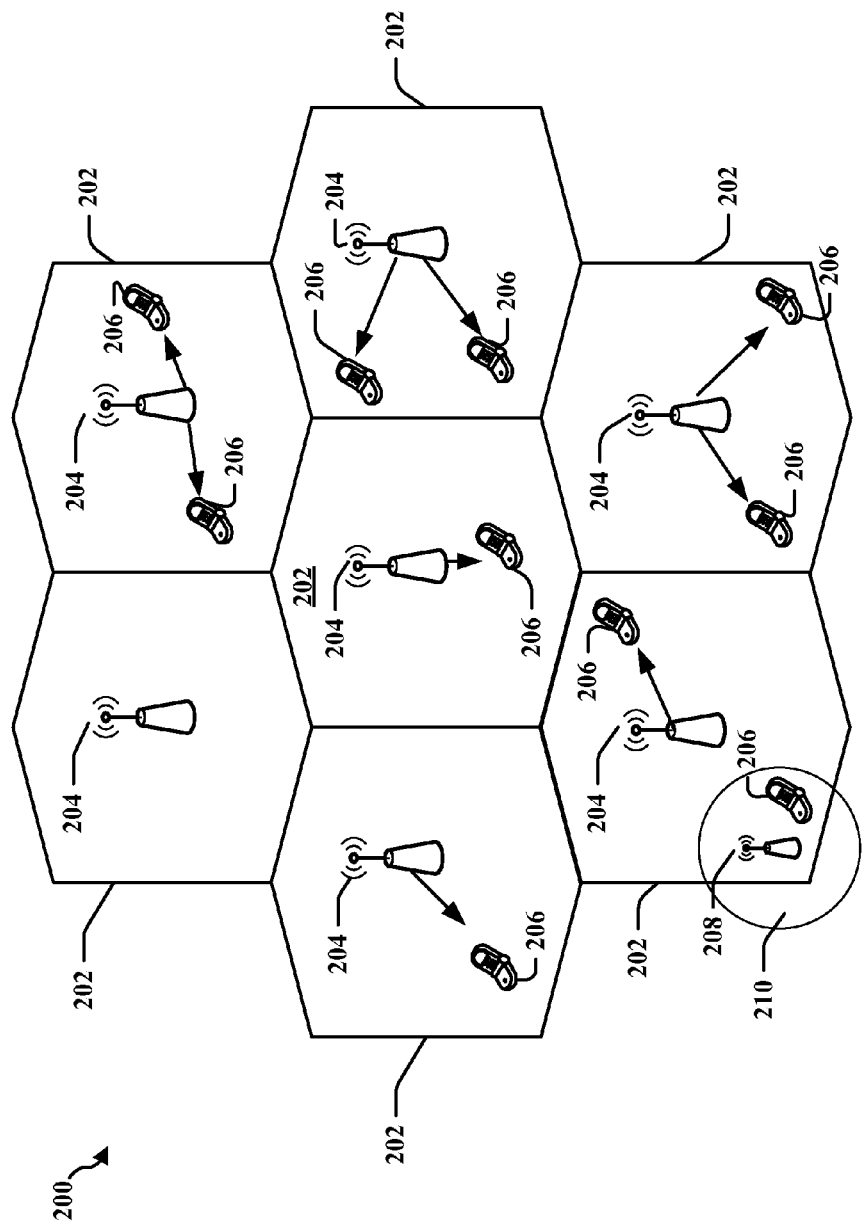
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
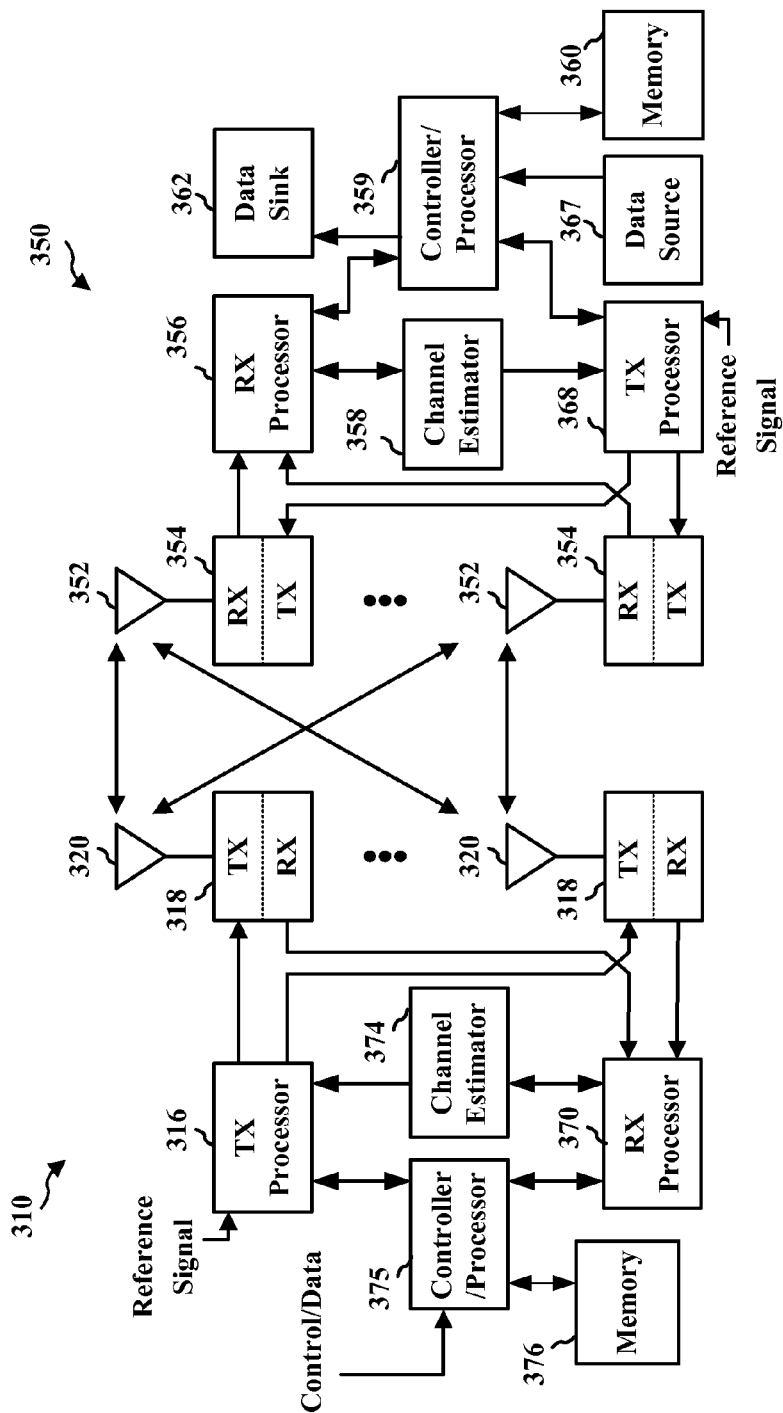
FIG. 3 is a diagram illustrating an example of a base station and user equipment in an access network.

FIG. 3 is a block diagram of a base station 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations.

In the UL, a data source 367 is used to provide upper layer packets to the controller/processor 359. The data source 367 represents all protocol layers above the L2 layer. Similar to the functionality described in connection with the DL transmission by the base station 310, the controller/processor 359 implements the L2 layer for the user plane and the control plane by providing header compression, ciphering, packet segmentation and reordering, and multiplexing between logical and transport channels based on radio resource allocations by the base station 310. The controller/processor 359 is also responsible for HARQ operations, retransmission of lost packets, and signaling to the base station 310.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the control/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
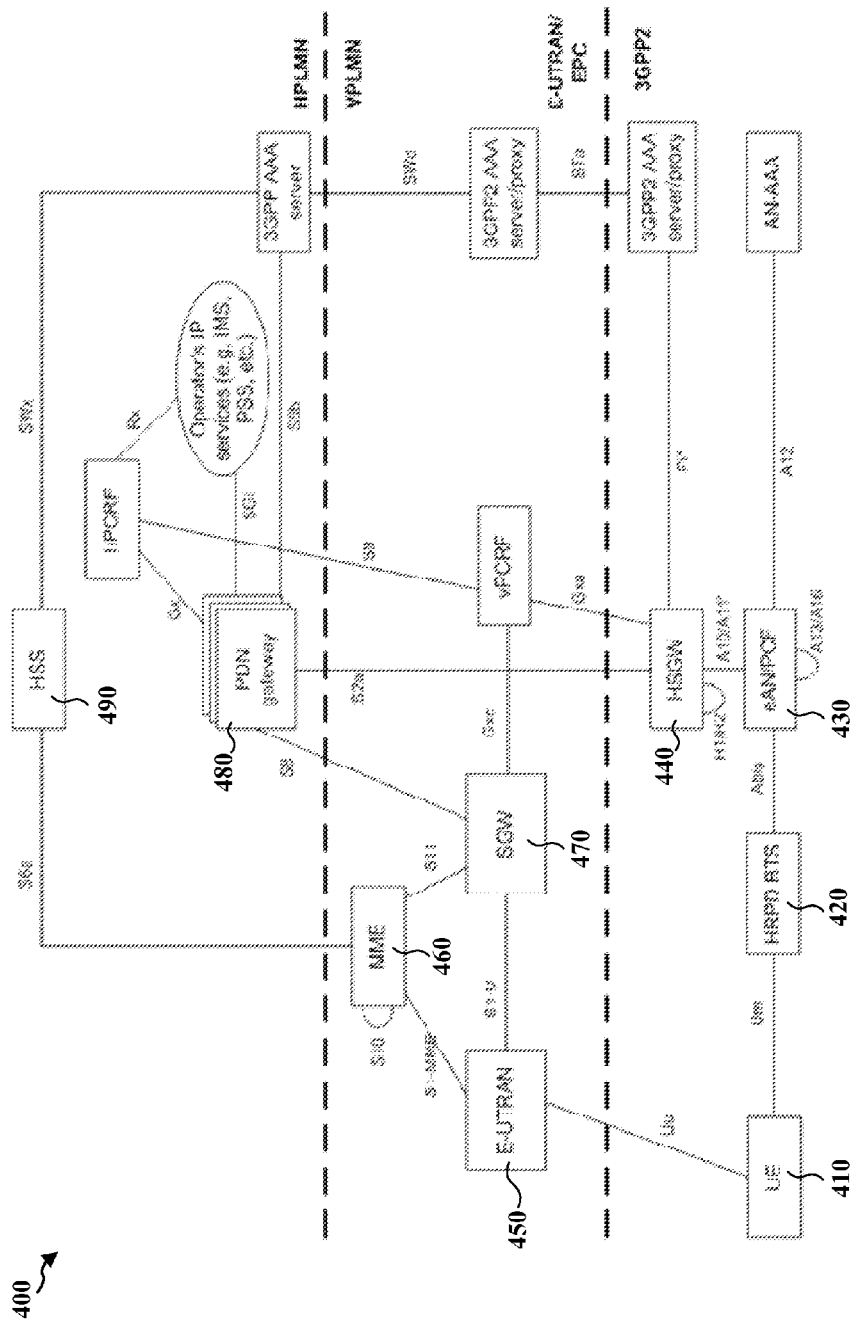
FIG. 4 is a diagram illustrating an interface between an evolved universal terrestrial radio access network (E-UTRAN)/evolved packet core (EPC) system and a 3GPP2 core network.

FIG. 4 is a diagram 400 illustrating an interface between an evolved universal terrestrial radio access network (E-UTRAN)/evolved packet core (EPC) system and a 3GPP2 core network. In one example, the UE 410 may have radio access to a high rate packet data serving gateway (HSGW) 440 and an enhanced high rate packet data access network (eAN)/packet control function (PCF) 430 via a high rate packet data (HRPD) base transceiver station (BTS) 420. The UE 410 may also have radio access to an E-UTRAN 450. As such, FIG. 4 illustrates how the UE 410 accesses the EPC from an LTE radio access technology and an enhanced high rate packet data (eHRPD) radio access technology.

The EPC is a common core network for an LTE or eHRPD wireless communication system. The common core network serves as a common backbone infrastructure for a wireless communication system. The EPC may include any one of the following entities: mobility management entity (MME) 460, serving gateway (SGW) 470, packet data network (PDN) gateway 480, home subscriber server (HSS) 490, authentication authorization and accounting entity (AAA), access network discovery and selection function (ANDSF), evolved packet data gateway (ePDG), etc.

A traffic flow template (TFT) is a set of all packet filters associated with an evolved packet system (EPS) bearer. A packet filter may be associated with a protocol and identified by a packet filter identifier (ID). For example, if a particular type of traffic exists having a particular destination port, then a packet filter may be created indicating the particular destination port and associated with a particular packet filter ID. Several packet filters may be combined to form the TFT.

In an aspect, a TFT setup is a packet filter setup used to determine which Internet protocol (IP) flows, identified by a respective packet filter, should be granted what particular quality of service (QoS). If a particular packet filter requires a particular QoS, then the TFT may be considered the mechanism for establishing the requirement so that both a network and device can follow the requirement during a session.

Figure 5:
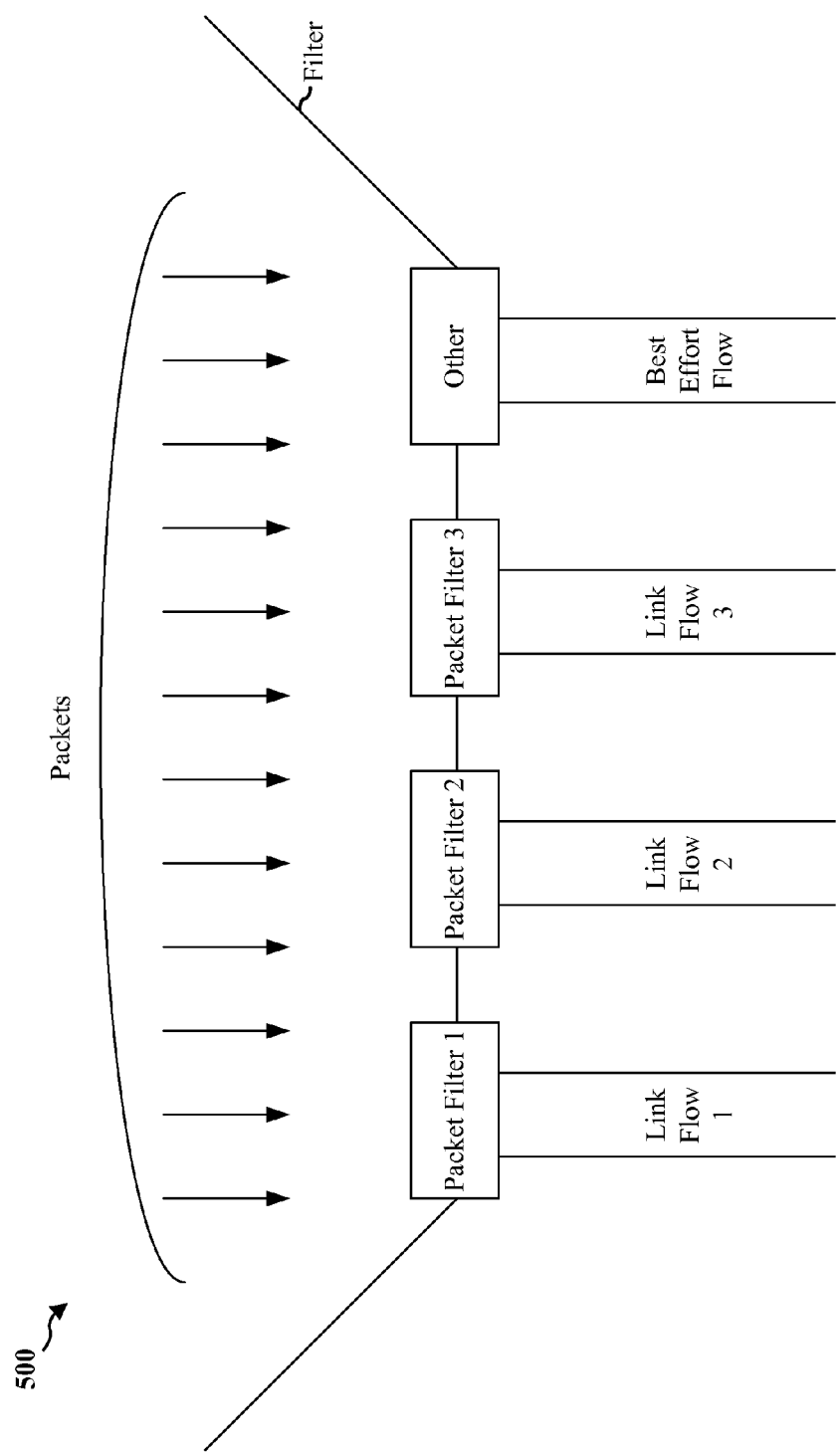
FIG. 5 is a diagram illustrating an example of a TFT.

FIG. 5 is a diagram 500 illustrating an example of a TFT. Referring to FIG. 5, the TFT includes packet filters 1, 2, and 3 respectively associated with link flows 1, 2, and 3, for example. The TFT also includes a mechanism for directing data packets to a best effort flow. Although only three packet filters respectively associated with three link flows are shown in FIG. 5, additional packet filters associated with additional link flows may be included in the TFT.

Still referring to FIG. 5, when a data packet is determined to be transmitted, the data packet is attempted to be matched to one of the packet filters of the TFT having an associated link flow. All data packets that are matched to a particular packet filter are assigned a particular QoS. Thus, there exists a link layer flow/bearer capable of carrying those packets. By attempting the packet filter match, the data packet may be directed to a particular bearer (i.e., link layer flow) having a certain QoS.

If the data packet does not match any of the packet filters of the TFT, the non-matching data packet is directed to the best effort flow. In particular, a transmitter may transmit higher layer octets belonging to a higher layer flow identified by a reservation message that is bound to a de-activated link flow using a link flow with a reservation label 0xFF if the higher layer flow provides an octet stream with octet-based HDLC-like framing to an Enhanced Multi-flow Packet Application. The transmitter should transmit higher layer packets belonging to a higher layer flow that is not associated with any link flow using the link flow with the reservation label 0xFE if the higher layer flow provides an IP packet stream to the Enhanced Multi-flow Packet Application.

Once the non-matching data packet is in the best effort flow, the data packet will be sent to a receiver according to the best of a sender's ability. However, sending of the non-matching data packet is not guaranteed. If other link flows have priority, then the best effort flow will yield to a higher priority flow, and the non-matching packet will be sent when resources become available.

In an aspect, if a data packet does not match any previously setup packet filters in the TFT, the data packet may be dropped or discarded. Here, a best effort packet filter may be explicitly assigned in the TFT for a best effort link flow. Thus, even if the data packet is a best effort type of packet, the data packet would need to match the best effort packet filter to avoid being discarded.

Figure 6:
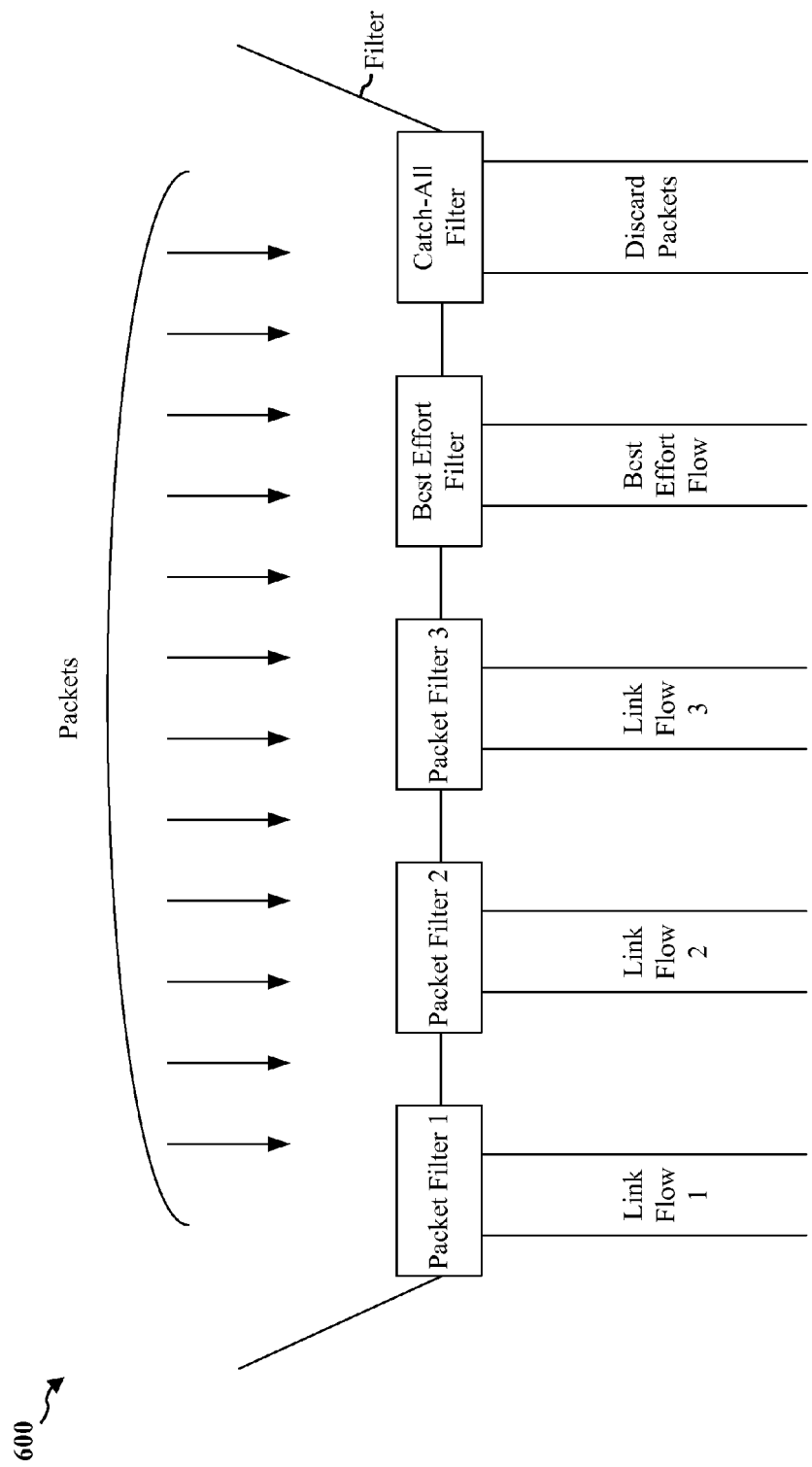
FIG. 6 is a diagram illustrating another example of a TFT.

FIG. 6 is a diagram 600 illustrating another example of a TFT. Referring to FIG. 6, the TFT includes packet filters 1, 2, and 3 respectively associated with link flows 1, 2, and 3, for example. The TFT also includes a best effort filter associated with a best effort flow and a catch-all filter. Data packets associated with the catch-all filter are dropped or discarded by a transmitter.

Referring to FIG. 6, to implement the catch-all filter for discarding packets, an air interface may be changed to discard packets directed towards 0xFE and 0xFF. For example, an attribute may be added to a packet application, such as Enhanced Multi-flow Packet Application (EMFPA) or Multi-link Multi-flow Packet Application (MMPA). The new attribute changes the meaning of plumbing of "default/unassigned" packet filters to 0xFF and 0xFF flows. When DiscardDefaultPacketFilter is set to 0 (default), then the UE and network may follow existing behavior. However, when DiscardDefaultPacketFilter is set to 1 (discard default packets), then the transmitter discards higher layer octets or packets belonging to a higher layer flow identified by a reservation that is bound to a de-activated link flow or when a higher layer flow is not identified for the octets/packets. In this case, a new reservation label is created for transmitting best effort packets, where as the reservation labels 0xFF and 0xFE are considered for discarding packets.

Still referring to FIG. 6, to implement the catch-all filter for discarding packets, a default catch-all filter may be associated with a deactivated link flow. The catch-all filter may be a filter that is the complement of all the previously setup filters in the TFT. Moreover, the catch-all filter may be updated whenever a new packet filter is added/removed from the TFT.

The catch-all filter may be implemented using rules set at RSVP signaling. A new field to the TFT may be added that indicates whether a "catch-all-discard" function (discard attribute/information element/function) should be enabled or not. Alternatively, a new configuration option may be added to an IP Configuration Protocol (IPCP) or to a vendor specific network control protocol (VSNCP) indicating whether a "catch-all-discard" function should be enabled or not for a particular PDN gateway (P-GW).

Figure 7:
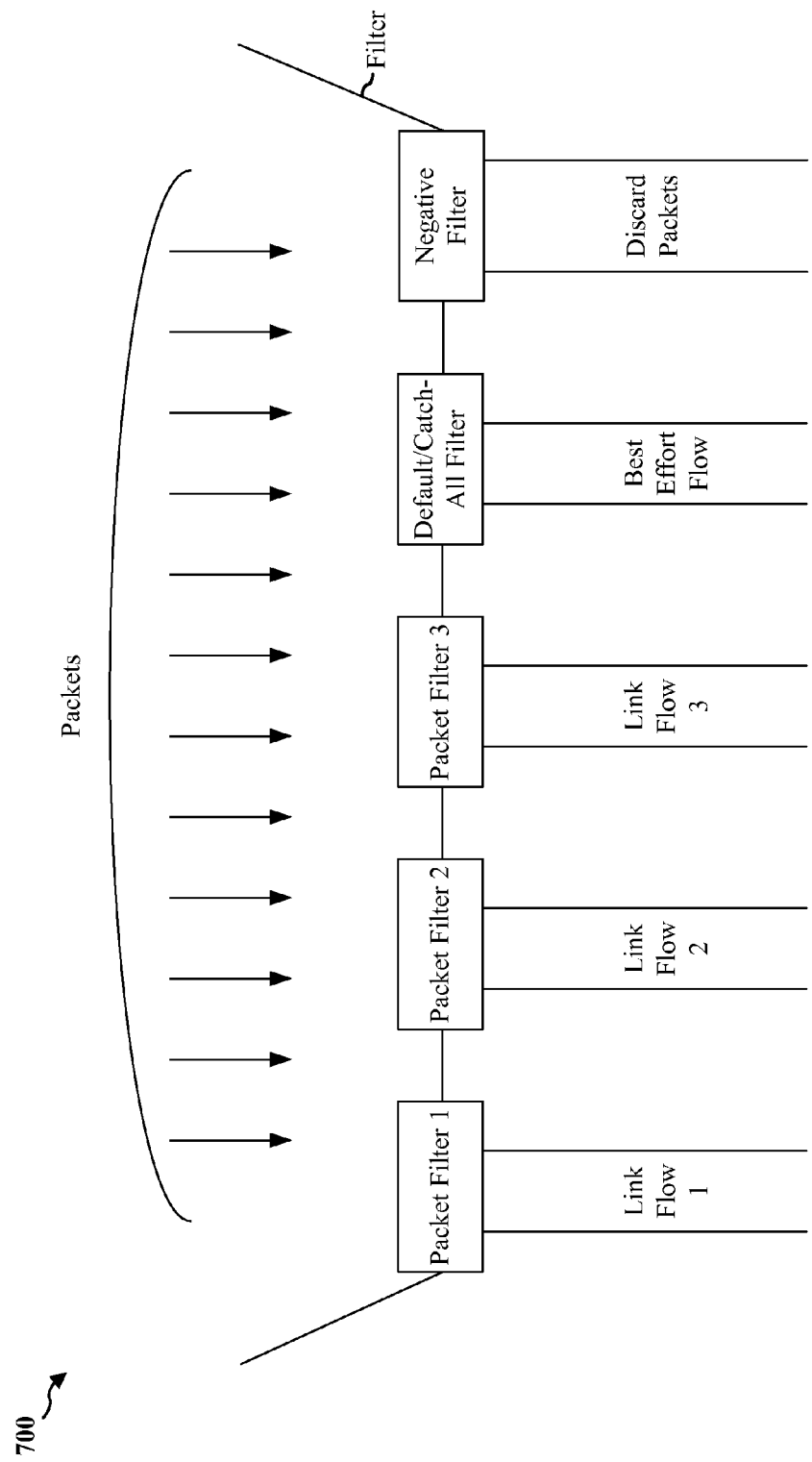
FIG. 7 is a diagram illustrating another example of a TFT.

FIG. 7 is a diagram 700 illustrating another example of a TFT. Referring to FIG. 7, the TFT includes packet filters 1, 2, and 3 respectively associated with link flows 1, 2, and 3, for example. The TFT also includes a default/catch-all filter and a negative filter. The default/catch-all filter may be bound to a best effort flow. Hence, data packets associated with the default/catch-all filter are sent to the best effort flow. Once a data packet is in the best effort flow, the data packet will be sent to a receiver according to the best of a transmitter's ability. Sending of the data packet is not guaranteed. If other link flows have priority, then the best effort flow will yield to a higher priority flow, and the data packet will be sent when resources become available. Data packets associated with the negative filter are dropped or discarded by a transmitter.

Referring to FIG. 7, each packet filter of the TFT may include a field indicating whether a respective packet filter is to be considered as a negative packet filter or not. For example, a new value in a packet filter component identifier may indicate whether the packet filter is a negative packet filter. This allows an operator to control which of all IP flows should be blocked.

Figure 8:
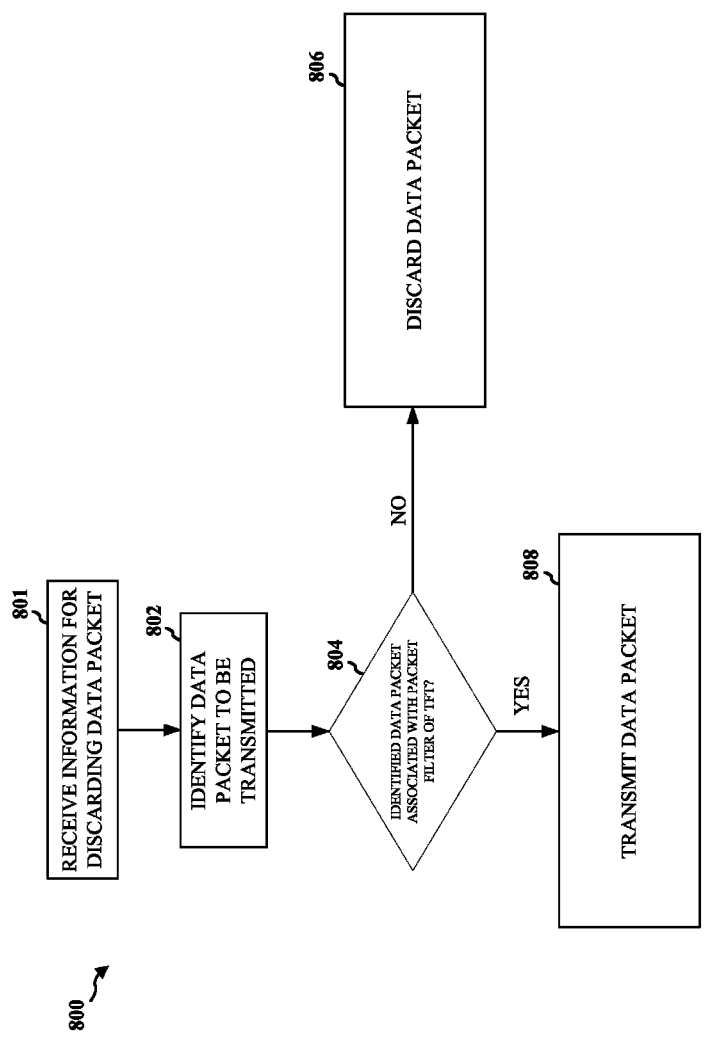
FIG. 8 is a flow chart of a method of managing a data flow.

FIG. 8 is a flow chart 800 of a method of managing a data flow. The method may be performed by a UE. At step 801, the UE receives information from a network for discarding a packet. The network may be a radio access network. The information may be received via a radio network reservation message, wherein the reservation message identifies at least one radio link flow respectively associated with at least one packet filter of a traffic flow template (TFT).

At step 802, the UE identifies a data packet to be transmitted. At step 804, the UE determines whether the identified data packet is associated with the at least one packet filter of the TFT.

At step 806, the UE discards the identified data packet that is determined not to be associated with the at least one packet filter of the TFT. Alternatively, at step 808, the UE transmits the identified data packet that is determined to be associated with the at least one packet filter of the TFT. The at least one packet filter of the TFT may be respectively associated with the at least one link flow identified in the reservation message. The at least one link flow may be a best effort link flow or a quality of service (QoS) link flow.

In an aspect, a link flow associated with the identified data packet is deactivated. Moreover, the received information may indicate that the identified data packet is to be discarded based on an enabled attribute included in a radio link packet application. The enabled attribute may indicate that the identified data packet is to be discarded when the identified data packet is associated with the deactivated link flow identified in the reservation message. Alternatively, the enabled attribute may indicate that the identified data packet is to be discarded when the identified data packet is associated with a link flow not identified in the reservation message.

In another aspect, the received information indicates that the identified data packet is to be discarded based on an enabled discard attribute/information element/function included in the TFT. The enabled discard attribute/information element/function may indicate that the identified data packet is to be discarded when the data packet is not associated with the at least one packet filter of the TFT.

In a further aspect, the received information indicates that the identified data packet is to be discarded based on an enabled discard function included in RSVP signaling or other techniques. The enabled discard function may indicate that the data packet is to be discarded when the identified data packet is not associated with the at least one packet filter of the TFT.

Figure 9:
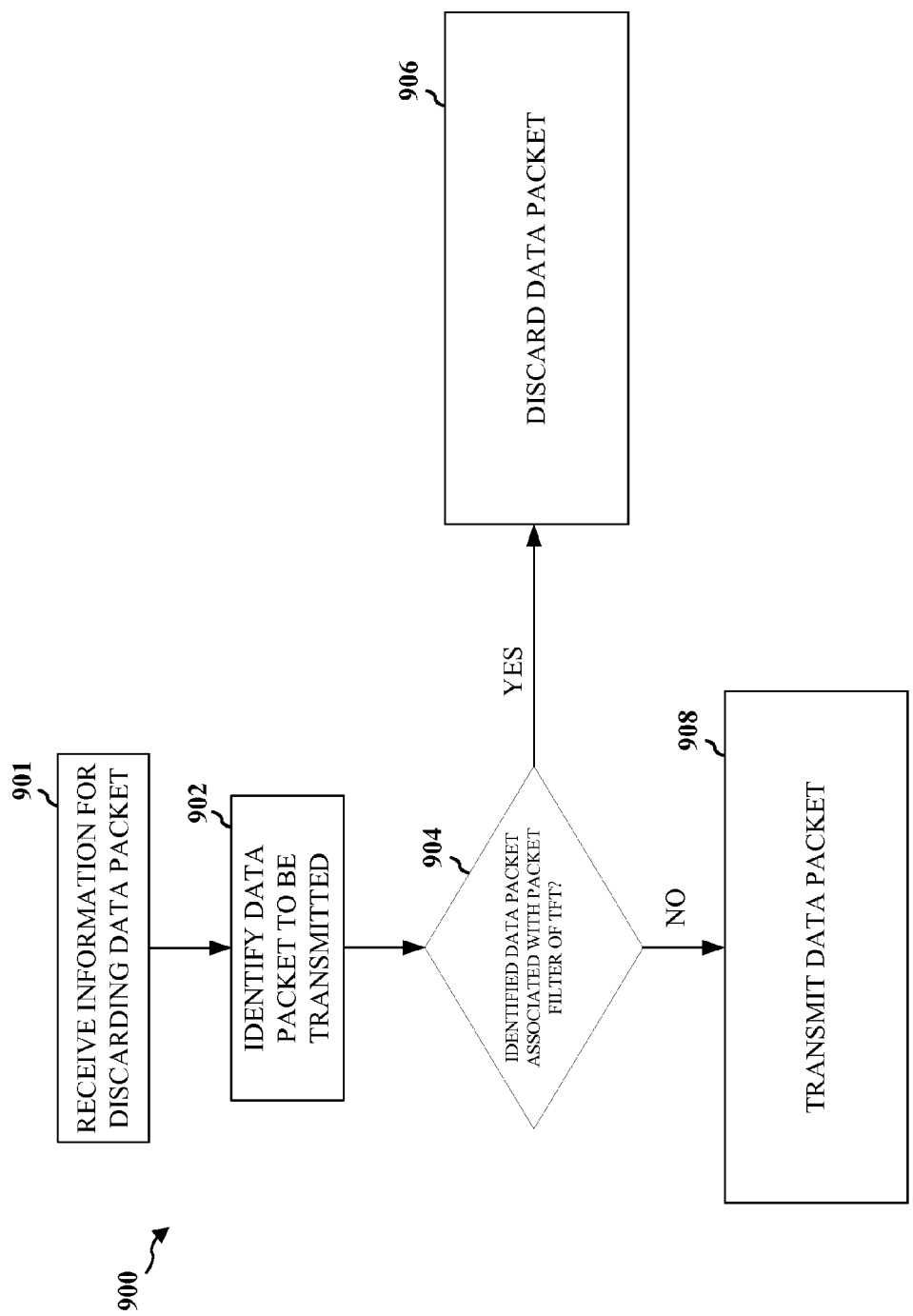
FIG. 9 is a flow chart of a method of managing a data flow.

FIG. 9 is a flow chart 900 of a method of managing a data flow. The method may be performed by a UE. At step 901, the UE receives information from a network for discarding a packet. The network may be a radio access network. The information may be received via a radio network reservation message, wherein the reservation message identifies at least one radio link flow respectively associated with at least one packet filter of a traffic flow template (TFT).

At step 902, the UE identifies a data packet to be transmitted. At step 904, the UE determines whether the identified data packet is associated with at least one packet filter of a traffic flow template (TFT). At step 906, the UE discards the identified data packet that is determined to be associated with the at least one packet filter of the TFT. Alternatively, at step 908, the UE transmits the data packet that is determined not to be associated with the at least one packet filter of the TFT. In an aspect, the information indicates that the identified data packet is to be discarded based on a negative packet filter included in the TFT, wherein the identified data packet is to be discarded when the identified data packet is associated with the negative packet filter. Accordingly, all packet filters of the TFT may include a field indicating whether a respective packet filter is the negative packet filter.

Figure 10:
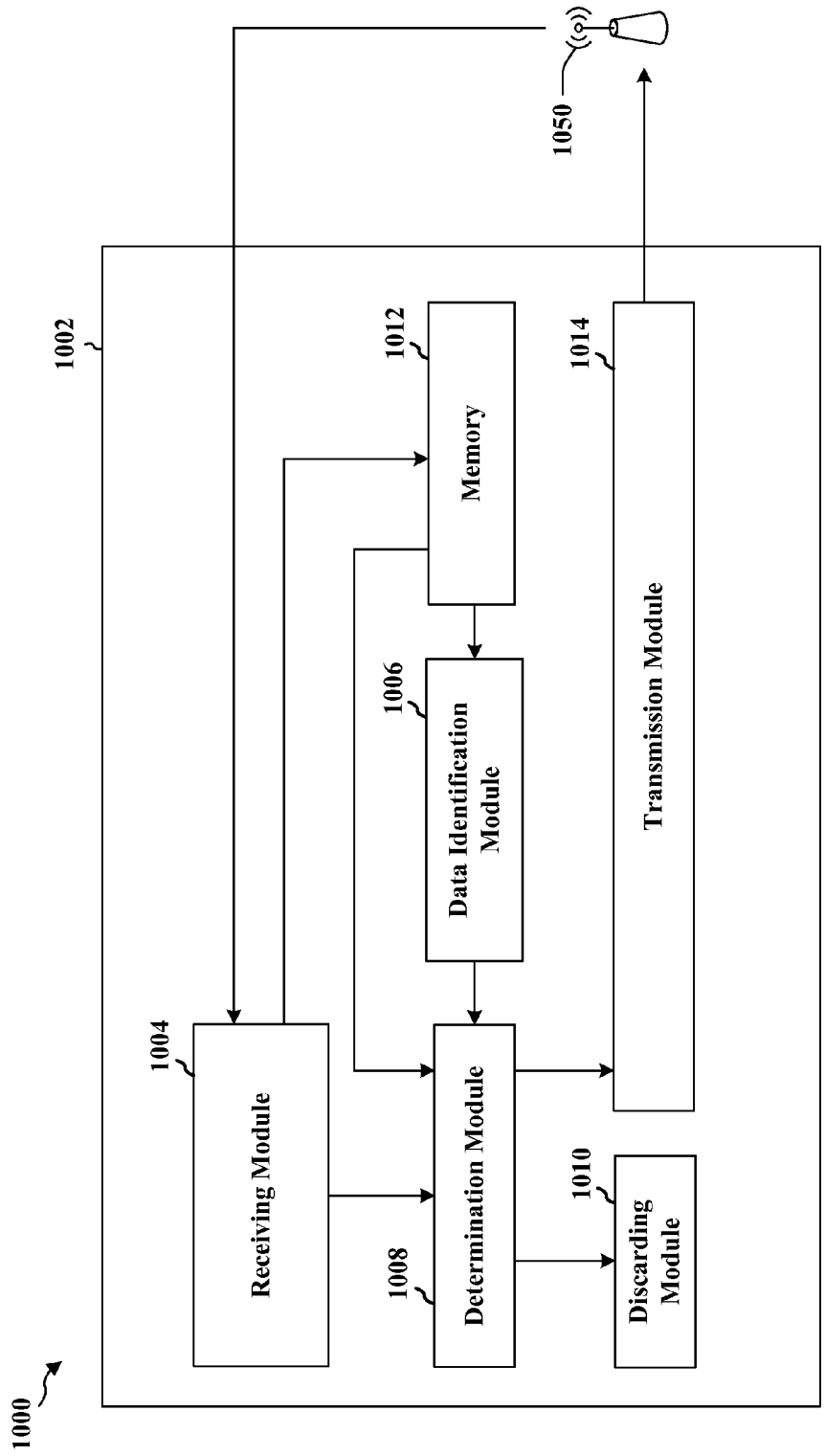
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus may be a UE. The apparatus includes a receiving module 1004, a data identification module 1006, a determination module 1008, a discarding module 1010, a memory 1012, and a transmission module 1014.

The receiving module 1004 may receive information from a network node 1050 for discarding a packet. The network node 1050 may be part of a radio access network. The information may be received via a radio network reservation message, wherein the reservation message identifies at least one link flow respectively associated with at least one packet filter of a traffic flow template (TFT). The data identification module 1006 may identify a data packet to be transmitted. The determination module 1006 may determine whether the identified data packet is associated with the at least one packet filter of the TFT.

The discarding module 1010 may discard the identified data packet that is determined not to be associated with the at least one packet filter of the TFT. Alternatively, the transmission module 1014 may transmit the identified data packet that is determined to be associated with the at least one packet filter of the TFT. The at least one packet filter of the TFT may be respectively associated with the at least one link flow identified in the reservation message received by the receiving module 1004. The at least one link flow may be a best effort link flow or a quality of service (QoS) link flow.

In an aspect, a link flow associated with the identified data packet is deactivated. Moreover, the received information may indicate that the identified data packet is to be discarded based on an enabled attribute included in a radio link packet application. The enabled attribute may indicate that the identified data packet is to be discarded when the identified data packet is associated with the deactivated link flow identified in the reservation message. Alternatively, the enabled attribute may indicate that the identified data packet is to be discarded when the identified data packet is associated with a link flow not identified in the reservation message.

In another aspect, the received information indicates that the identified data packet is to be discarded based on an enabled discard attribute/information element/function included in the TFT. The enabled discard attribute/information element/function may indicate that the identified data packet is to be discarded when the identified data packet is not associated with the at least one packet filter of the TFT.

In a further aspect, the received information indicates that the identified data packet is to be discarded based on an enabled discard function included in a vendor specific network control protocol (VSNCP). The enabled discard function may indicate that the identified data packet is to be discarded when the identified data packet is not associated with the at least one packet filter of the TFT.

In yet another aspect, the discarding module 1010 may discard the identified data packet that is determined to be associated with the at least one packet filter of the TFT. As such, in the alternative, the transmission module 1014 may transmit the identified data packet that is determined to be associated with the at least one packet filter of the TFT. In an aspect, the information indicates that the identified data packet is to be discarded based on a negative packet filter included in the TFT, wherein the identified data packet is to be discarded when the identified data packet is associated with the negative packet filter. Accordingly, all packet filters of the TFT may include a field indicating whether a respective packet filter is the negative packet filter.

The apparatus may include additional modules that perform each of the steps of the algorithm in the aforementioned flow charts of FIGS. 8-9. As such, each step in the aforementioned flow charts of FIGS. 8-9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
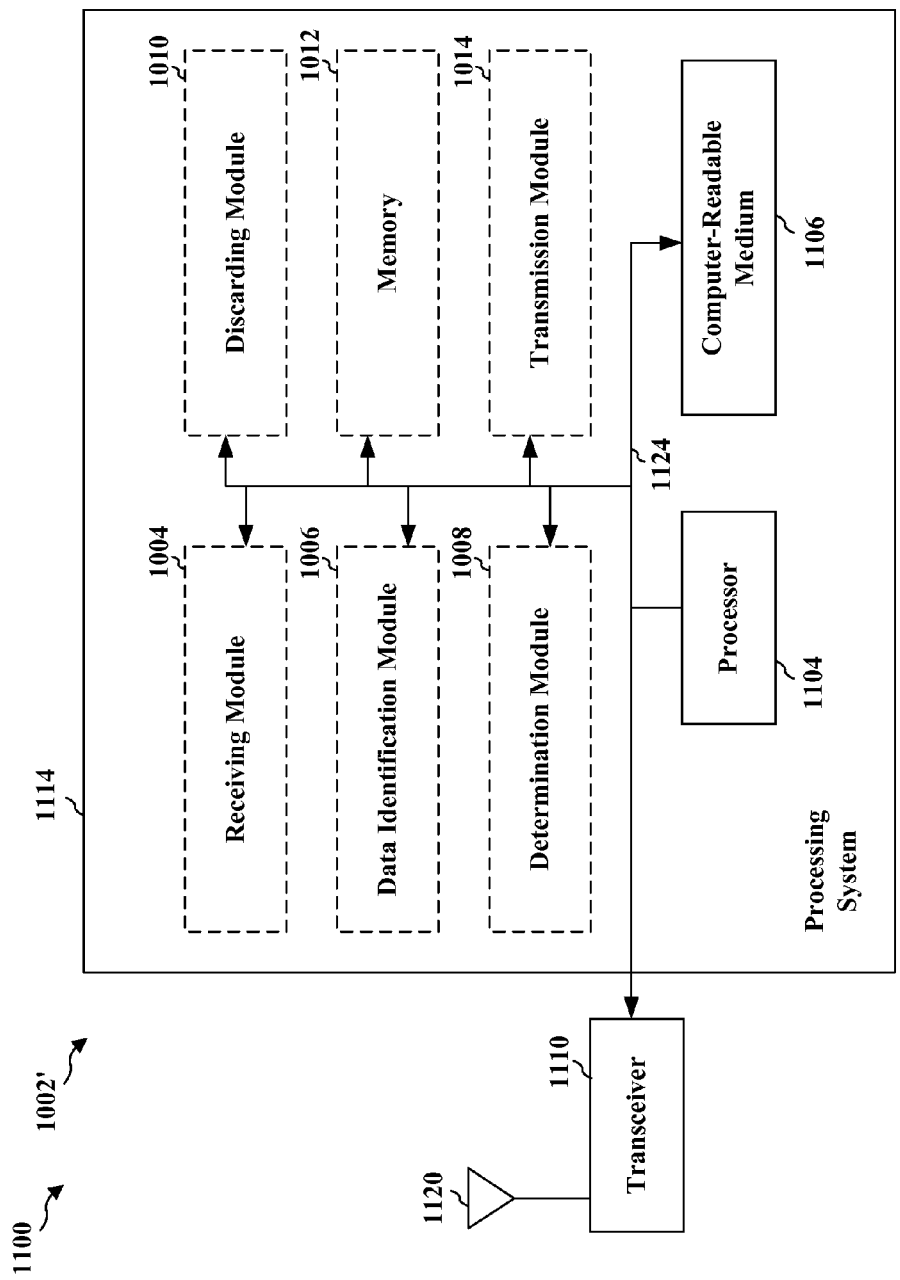
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1004, 1006, 1008, 1010, 1012, 1014, and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system further includes at least one of the modules 1004, 1006, 1008, 1010, 1012, and 1014. The modules may be software modules running in the processor 1104, resident/stored in the computer readable medium 1106, one or more hardware modules coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' includes means for receiving information from a network for discarding a data packet, means for identifying a data packet to be transmitted, means for determining whether the identified data packet is associated with at least one packet filter of a traffic flow template (TFT), means for discarding the identified data packet based on whether the identified data packet is associated with the at least one packet filter of the TFT, means for discarding the identified data packet that is determined not to be associated with the at least one packet filter of the TFT, and means for discarding the identified data packet that is determined to be associated with the at least one packet filter of the TFT.

The aforementioned means may be one or more of the aforementioned modules of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
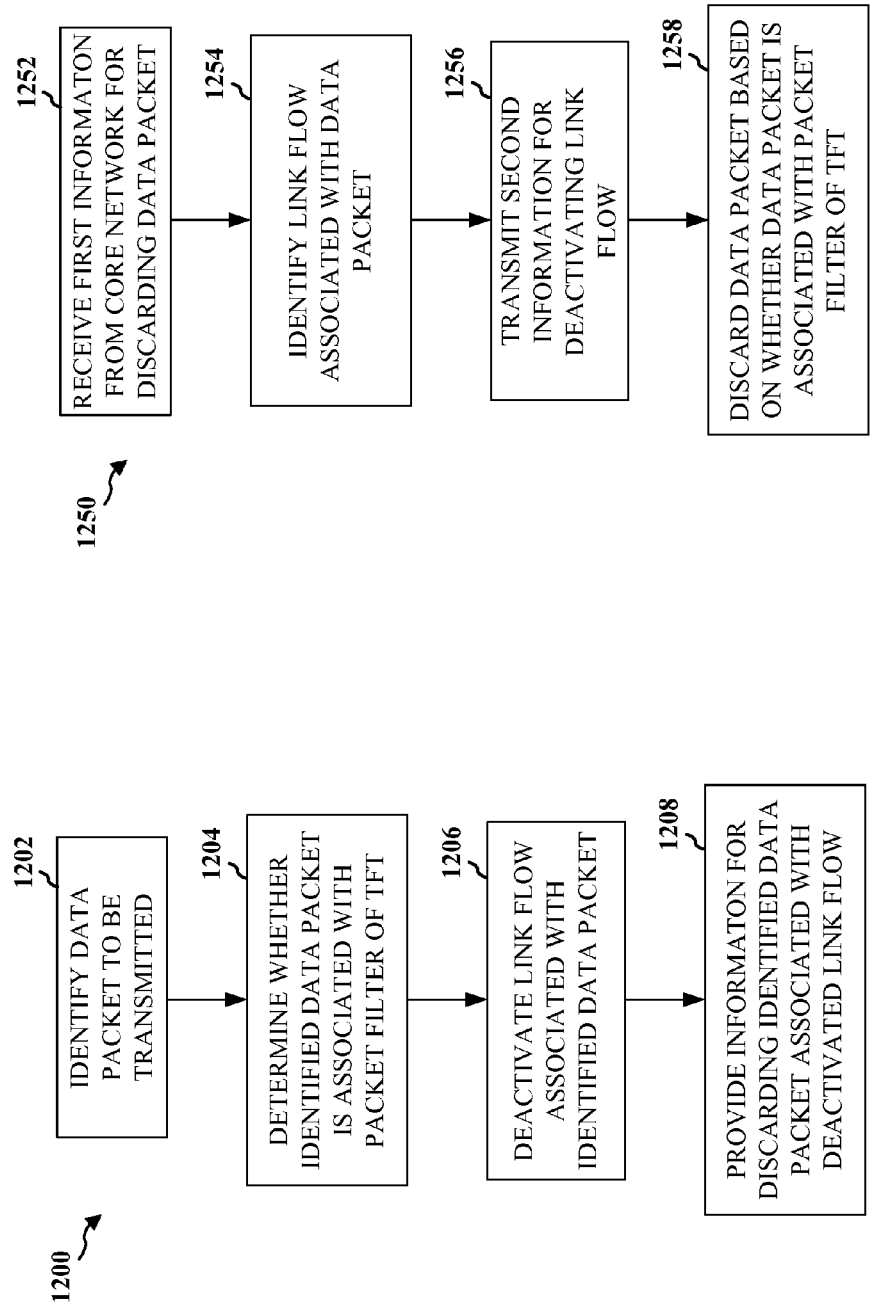
FIG. 12A is a flow chart of a method of managing a data flow.
FIG. 12B is a flow chart of a method of managing a data flow.

FIG. 12A is a flow chart 1200 of a method of managing a data flow. The method may be performed by a network node of a radio access network. At step 1202, the network node identifies a data packet to be transmitted. At step 1204, the network node determines whether the identified data packet is associated with at least one packet filter of a traffic flow template (TFT).

At step 1206, the network node deactivates a link flow associated with the identified data packet based on whether the identified data packet is associated with the at least one packet filter of the TFT. At step 1208, the network node provides information to a device to discard the identified data packet associated with the deactivated link flow.

In an aspect, the information may indicate that the identified data packet is to be discarded when the identified data packet is determined not to be associated with the at least one packet filter of the TFT. In another aspect, the information may be provided to the device via a radio network reservation message. The reservation message may identify at least one radio link flow respectively associated with the at least one packet filter of the TFT. The at least one link flow may include a best effort link flow or a quality of service (QoS) link flow.

In a further aspect, the information may indicate that the identified data packet is to be discarded based on an enabled attribute included in a radio link packet application. For example, the enabled attribute may indicate that the identified data packet is to be discarded when the identified data packet is associated with the deactivated link flow identified in the reservation message. Alternatively, the enabled attribute may indicate that the identified data packet is to be discarded when the identified data packet is associated with a link flow not identified in the reservation message.

In an aspect, the information may indicate that the identified data packet is to be discarded based on an enabled discard attribute/information element/function included in the TFT. For example, the enabled discard attribute/information element/function may indicate that the identified data packet is to be discarded when the identified data packet is not associated with the at least one packet filter of the TFT.

In another aspect, the information may indicate that the identified data packet is to be discarded based on an enabled discard function included in a vendor specific network control protocol (VSNCP). For example, the enabled discard function may indicate that the identified data packet is to be discarded when the identified data packet is not associated with the at least one packet filter of the TFT.

In a further aspect, the information may indicate that the identified data packet is to be discarded based on a negative packet filter included in the TFT. For example, the identified data packet is to be discarded when the identified data packet is associated with the negative packet filter. Accordingly, all packet filters of the TFT may include a field indicating whether a respective packet filter is the negative packet filter.

FIG. 12B is a flow chart 1250 of a method of managing a data flow. The method may be performed by a network node of a radio access network. At step 1252, the network node receives first information from a core network for discarding a data packet. At step 1254, the network node identifies a link flow associated with the data packet. At step 1256, the network node transmits second information for deactivating the identified link flow. At step 1258, the network node discards the identified data packet based on whether the identified data packet is associated with at least one packet filter of a traffic flow template (TFT).

In an aspect, the first information indicates a reservation identifier associated with the at least one packet filter associated with the identified data packet to be discarded. The first information may be received via radio bearer signaling between the core network and the radio access network. Moreover, the second information may be transmitted to a device via a radio network reservation message, the reservation message identifying at least one radio link flow respectively associated with the at least one packet filter of the TFT.

Figure 13:
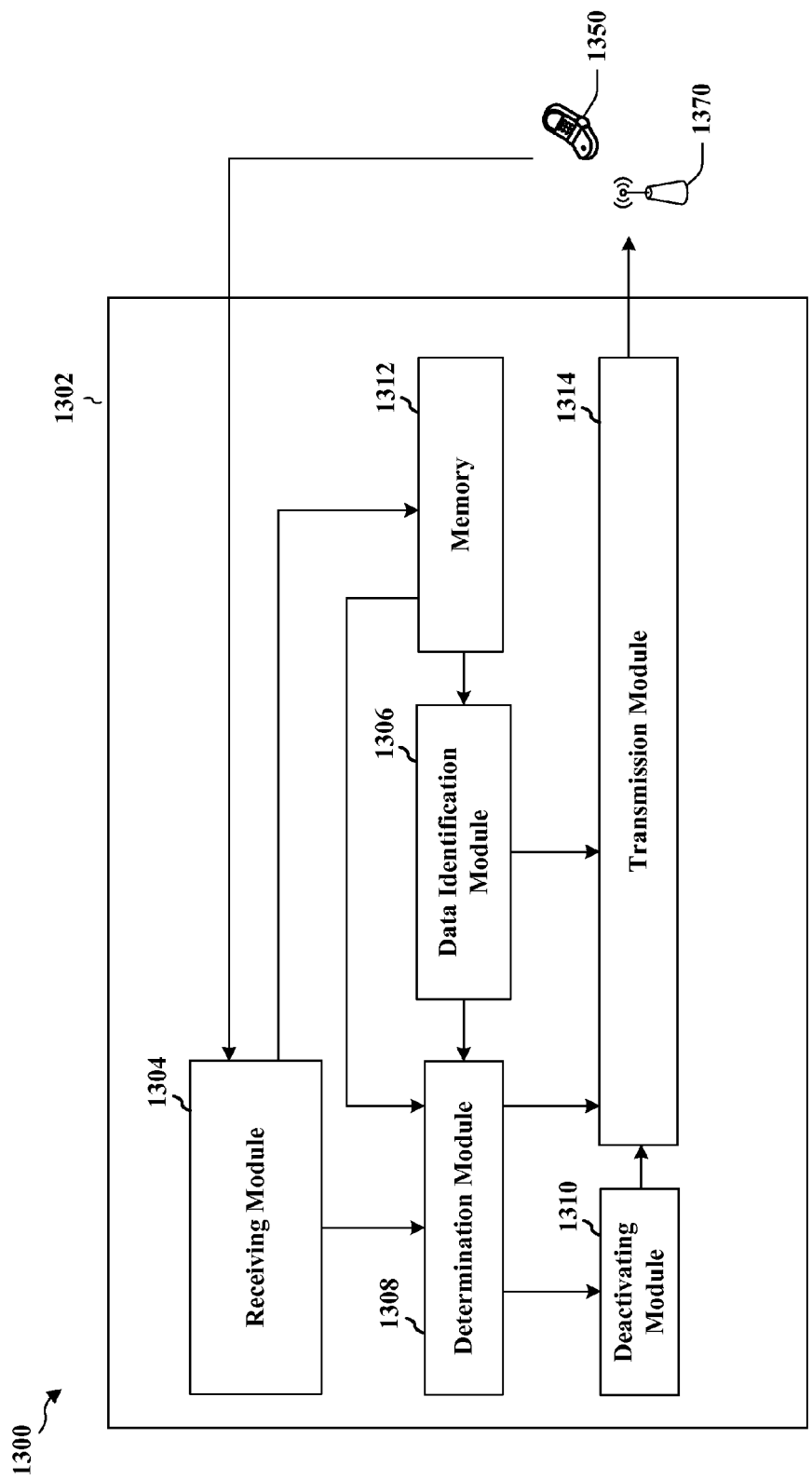
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 1302. The apparatus may be a network node of a radio access network. The apparatus includes a receiving module 1304, a data identification module 1306, a determination module 1308, a deactivating module 1310, a memory 1312, and a transmission module 1314.

The data identification module 1306 identifies a data packet to be transmitted. The determination module 1308 determines whether the identified data packet is associated with at least one packet filter of a traffic flow template (TFT).

The deactivating module 1310 deactivates a link flow associated with the identified data packet based on whether the identified data packet is associated with the at least one packet filter of the TFT. The transmission module 1314 provides information to a device 1350 to discard the identified data packet associated with the deactivated link flow.

In an aspect, the information may indicate that the identified data packet is to be discarded when the identified data packet is determined not to be associated with the at least one packet filter of the TFT. In another aspect, the information may be provided to the device via a radio network reservation message. The reservation message may identify at least one link flow respectively associated with the at least one packet filter of the TFT. The at least one link flow may include a best effort link flow or a quality of service (QoS) link flow.

In a further aspect, the information may indicate that the identified data packet is to be discarded based on an enabled attribute included in a radio link packet application. For example, the enabled attribute may indicate that the identified data packet is to be discarded when the identified data packet is associated with the deactivated link flow identified in the reservation message. Alternatively, the enabled attribute may indicate that the identified data packet is to be discarded when the identified data packet is associated with a link flow not identified in the reservation message.

In an aspect, the information may indicate that the identified data packet is to be discarded based on an enabled discard attribute/information element/function included in the TFT. For example, the enabled discard attribute/information element/function may indicate that the identified data packet is to be discarded when the identified data packet is not associated with the at least one packet filter of the TFT.

In another aspect, the information may indicate that the identified data packet is to be discarded based on an enabled discard function included in a vendor specific network control protocol (VSNCP). For example, the enabled discard function may indicate that the identified data packet is to be discarded when the identified data packet is not associated with the at least one packet filter of the TFT.

In a further aspect, the information may indicate that the identified data packet is to be discarded based on a negative packet filter included in the TFT. For example, the identified data packet is to be discarded when the identified data packet is associated with the negative packet filter. Accordingly, all packet filters of the TFT may include a field indicating whether a respective packet filter is the negative packet filter.

In an embodiment, the receiving module 1304 receives first information from a core network (e.g., via network node 1370) for discarding a data packet. The determination module 1308 then identifies a link flow associated with the data packet. Accordingly, the deactivating module 1310 may then transmit (via transmission module 1314) second information for deactivating the identified link flow. The deactivating module 1310 may also discard the identified data packet based on whether the identified data packet is associated with at least one packet filter of a traffic flow template (TFT). In an aspect, the first information indicates a reservation identifier associated with the at least one packet filter associated with the identified data packet to be discarded. The first information may be received via radio bearer signaling between the core network and the radio access network. Moreover, the second information may be transmitted to a device via a radio network reservation message, the reservation message identifying at least one radio link flow respectively associated with the at least one packet filter of the TFT.

The apparatus may include additional modules that perform each of the steps of the algorithm in the aforementioned flow charts of FIGS. 12A-12B. As such, each step in the aforementioned flow charts of FIGS. 12A-12B may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
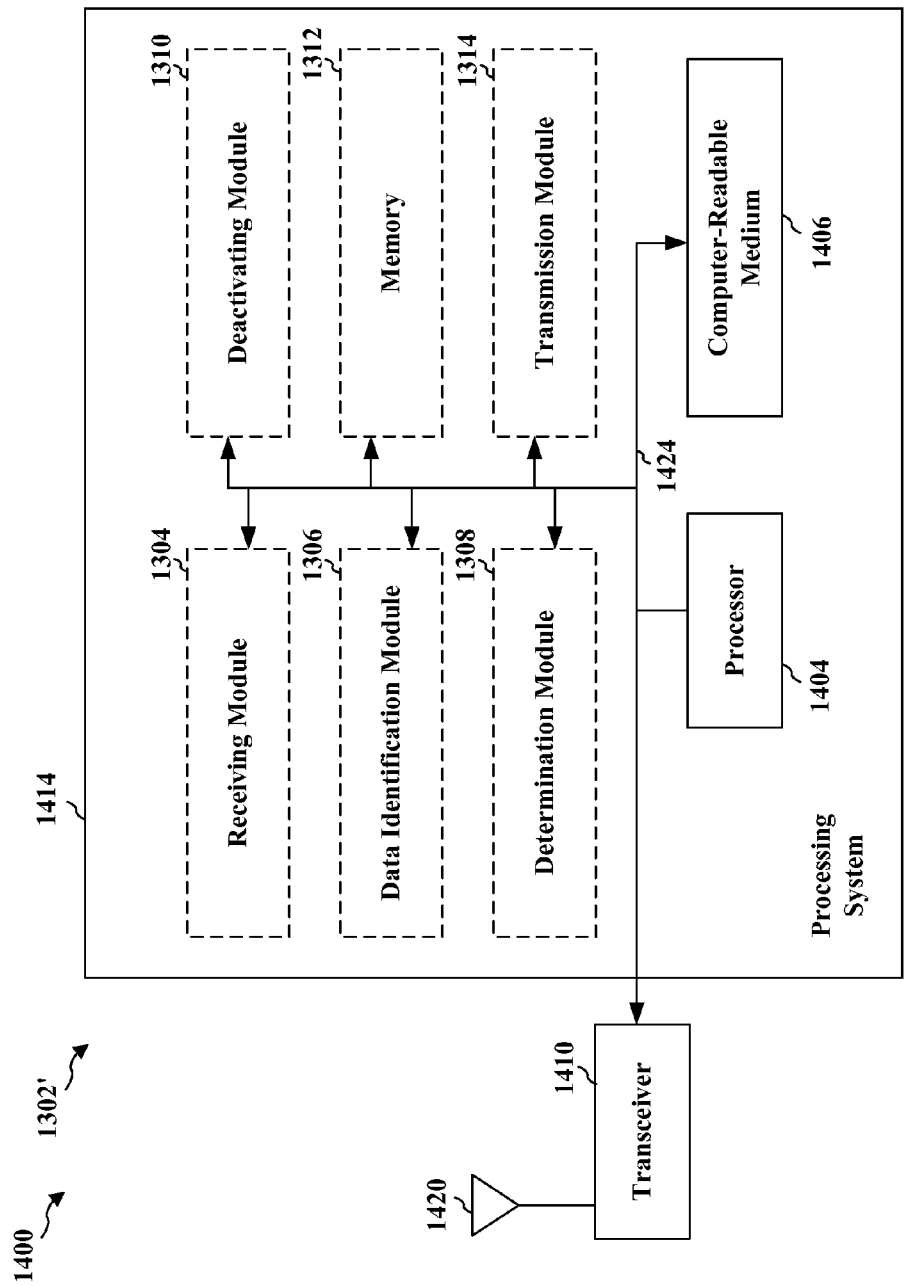
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1304, 1306, 1308, 1310, 1312, 1314, and the computer-readable medium 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The processing system 1414 includes a processor 1404 coupled to a computer-readable medium 1406. The processor 1404 is responsible for general processing, including the execution of software stored on the computer-readable medium 1406. The software, when executed by the processor 1404, causes the processing system 1414 to perform the various functions described supra for any particular apparatus. The computer-readable medium 1406 may also be used for storing data that is manipulated by the processor 1404 when executing software. The processing system further includes at least one of the modules 1304, 1306, 1308, 1310, 1312, and 1314. The modules may be software modules running in the processor 1404, resident/stored in the computer readable medium 1406, one or more hardware modules coupled to the processor 1404, or some combination thereof. The processing system 1414 may be a component of the eNB 310 and may include the memory 376 and/or at least one of the TX processor 316, the RX processor 370, and the controller/processor 375.

In one configuration, the apparatus 1302/1302' includes means for identifying a data packet to be transmitted, means for determining whether the identified data packet is associated with at least one packet filter of a traffic flow template (TFT), means for deactivating a link flow associated with the identified data packet based on whether the identified data packet is associated with the at least one packet filter of the TFT, and means for providing information to a device to discard the identified data packet associated with the deactivated link flow, means for receiving first information from a core network for discarding a data packet, means for identifying a link flow associated with the data packet, means for transmitting second information for deactivating the identified link flow, and means for discarding the identified data packet based on whether the identified data packet is associated with at least one packet filter of a traffic flow template (TFT).

The aforementioned means may be one or more of the aforementioned modules of the apparatus 1302 and/or the processing system 1414 of the apparatus 1302' configured to perform the functions recited by the aforementioned means. As described supra, the processing system 1414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of managing a data flow, comprising:
   receiving information from a network for discarding a data packet;
   identifying a data packet to be transmitted;
   determining whether the identified data packet is associated with at least one packet filter of a traffic flow template (TFT); and
   discarding the identified data packet based on whether the identified data packet is associated with the at least one packet filter of the TFT.

2. The method of claim 1, wherein the network is a radio access network.

3. The method of claim 1, wherein the information is received via a radio network reservation message, the reservation message identifying at least one radio link flow respectively associated with the at least one packet filter of the TFT.

4. The method of claim 3, wherein the at least one link flow comprises a best effort link flow or a quality of service (QoS) link flow.

5. A method of managing a data flow, comprising:
   receiving information from a network for discarding a data packet;
   identifying a data packet to be transmitted;
   determining whether the identified data packet is associated with at least one packet filter of a traffic flow template (TFT); and
   discarding the identified data packet based on whether the identified data packet is associated with the at least one packet filter of the TFT,
   wherein the information indicates that the identified data packet is to be discarded based on an enabled discard function included in a RSVP,
   wherein the enabled discard function indicates that the identified data packet is to be discarded when the identified data packet is not associated with the at least one packet filter of the TFT.

6. The method of claim 1, wherein the information indicates that the identified data packet is to be discarded based on a negative packet filter included in the TFT,
   wherein the identified data packet is to be discarded when the identified data packet is associated with the negative packet filter.

7. The method of claim 6, wherein all packet filters of the TFT include a field indicating whether a respective packet filter is the negative packet filter.

8. A method of managing a data flow, comprising:
receiving information from a network for discarding a data packet;
identifying a data packet to be transmitted;
determining whether the identified data packet is associated with at least one packet filter of a traffic flow template (TFT); and
discarding the identified data packet based on whether the identified data packet is associated with the at least one packet filter of the TFT,
wherein the information is received via a radio network reservation message, the reservation message identifying at least one radio link flow respectively associated with the at least one packet filter of the TFT,
wherein a link flow associated with the identified data packet is deactivated,
wherein the information indicates that the identified data packet is to be discarded based on an enabled attribute included in a radio link packet application, and
wherein the enabled attribute indicates that the identified data packet is to be discarded when the identified data packet is associated with the deactivated link flow identified in the reservation message, or when the identified data packet is associated with a link flow not identified in the reservation message.

9. A method of managing a data flow, comprising:
receiving information from a network for discarding a data packet;
identifying a data packet to be transmitted;
determining whether the identified data packet is associated with at least one packet filter of a traffic flow template (TFT); and
discarding the identified data packet based on whether the identified data packet is associated with the at least one packet filter of the TFT,
wherein the information indicates that the identified data packet is to be discarded based on an enabled discard attribute/information element/function included in the TFT,
wherein the enabled discard attribute/information element/function indicates that the identified data packet is to be discarded when the identified data packet is not associated with the at least one packet filter of the TFT.

10. An apparatus for managing a data flow, comprising:
means for receiving information from a network for discarding a data packet;
means for identifying a data packet to be transmitted;
means for determining whether the identified data packet is associated with at least one packet filter of a traffic flow template (TFT); and
means for discarding the identified data packet based on whether the identified data packet is associated with the at least one packet filter of the TFT.

11. The apparatus of claim 10, wherein the network is a radio access network.

12. The apparatus of claim 10, wherein the information is received via a radio network reservation message, the reservation message identifying at least radio one link flow respectively associated with the at least one packet filter of the TFT.

13. The apparatus of claim 12, wherein the at least one link flow comprises a best effort link flow or a quality of service (QoS) link flow.

14. The apparatus of claim 10, wherein the information indicates that the identified data packet is to be discarded based on a negative packet filter included in the TFT,
wherein the identified data packet is to be discarded when the identified data packet is associated with the negative packet filter.

15. The apparatus of claim 14, wherein all packet filters of the TFT include a field indicating whether a respective packet filter is the negative packet filter.

16. An apparatus for managing a data flow, comprising:
means for receiving information from a network for discarding a data packet;
means for identifying a data packet to be transmitted;
means for determining whether the identified data packet is associated with at least one packet filter of a traffic flow template (TFT); and
means for discarding the identified data packet based on whether the identified data packet is associated with the at least one packet filter of the TFT,
wherein the information is received via a radio network reservation message, the reservation message identifying at least radio one link flow respectively associated with the at least one packet filter of the TFT,
wherein a link flow associated with the identified data packet is deactivated,
wherein the information indicates that the identified data packet is to be discarded based on an enabled attribute included in a radio link packet application, and
wherein the enabled attribute indicates that the identified data packet is to be discarded when the identified data packet is associated with the deactivated link flow identified in the reservation message, or when the identified data packet is associated with a link flow not identified in the reservation message.

17. An apparatus for managing a data flow, comprising:
means for receiving information from a network for discarding a data packet;
means for identifying a data packet to be transmitted;
means for determining whether the identified data packet is associated with at least one packet filter of a traffic flow template (TFT); and
means for discarding the identified data packet based on whether the identified data packet is associated with the at least one packet filter of the TFT,
wherein the information indicates that the identified data packet is to be discarded based on an enabled discard attribute/information element/function included in the TFT,
wherein the enabled discard attribute/information element/function indicates that the identified data packet is to be discarded when the identified data packet is not associated with the at least one packet filter of the TFT.

18. An apparatus for managing a data flow, comprising:
means for receiving information from a network for discarding a data packet;
means for identifying a data packet to be transmitted;
means for determining whether the identified data packet is associated with at least one packet filter of a traffic flow template (TFT); and
means for discarding the identified data packet based on whether the identified data packet is associated with the at least one packet filter of the TFT,
wherein the information indicates that the identified data packet is to be discarded based on an enabled discard function included in a RSVP, wherein the enabled discard function indicates that the identified data packet is to be discarded when the identified data packet is not associated with the at least one packet filter of the TFT.

19. An apparatus for managing a data flow, comprising:
at least one processor configured to:
receive information from a network for discarding a data packet;
identify a data packet to be transmitted;
determine whether the identified data packet is associated with at least one packet filter of a traffic flow template (TFT); and
discard the identified data packet based on whether the identified data packet is associated with the at least one packet filter of the TFT.

20. The apparatus of claim 19, wherein the network is a radio access network.

21. The apparatus of claim 19, wherein the information is received via a radio network reservation message, the reservation message identifying at least radio one link flow respectively associated with the at least one packet filter of the TFT.

22. The apparatus of claim 21, wherein the at least one link flow comprises a best effort link flow or a quality of service (QoS) link flow.

23. The apparatus of claim 19, wherein the information indicates that the identified data packet is to be discarded based on a negative packet filter included in the TFT,
wherein the identified data packet is to be discarded when the identified data packet is associated with the negative packet filter.

24. The apparatus of claim 23, wherein all packet filters of the TFT include a field indicating whether a respective packet filter is the negative packet filter.

25. An apparatus for managing a data flow, comprising:
at least one processor configured to:
receive information from a network for discarding a data packet;
identify a data packet to be transmitted;
determine whether the identified data packet is associated with at least one packet filter of a traffic flow template (TFT); and
discard the identified data packet based on whether the identified data packet is associated with the at least one packet filter of the TFT,
wherein the information is received via a radio network reservation message, the reservation message identifying at least radio one link flow respectively associated with the at least one packet filter of the TFT,
wherein a link flow associated with the identified data packet is deactivated,
wherein the information indicates that the identified data packet is to be discarded based on an enabled attribute included in a radio link packet application, and
wherein the enabled attribute indicates that the identified data packet is to be discarded when the identified data packet is associated with the deactivated link flow identified in the reservation message, or when the identified data packet is associated with a link flow not identified in the reservation message.

26. An apparatus for managing a data flow, comprising:
at least one processor configured to:
receive information from a network for discarding a data packet;
identify a data packet to be transmitted;
determine whether the identified data packet is associated with at least one packet filter of a traffic flow template (TFT); and
discard the identified data packet based on whether the identified data packet is associated with the at least one packet filter of the TFT,
wherein the information indicates that the identified data packet is to be discarded based on an enabled discard attribute/information element/function included in the TFT,
wherein the enabled discard attribute/information element/function indicates that the identified data packet is to be discarded when the identified data packet is not associated with the at least one packet filter of the TFT.

27. An apparatus for managing a data flow, comprising:
at least one processor configured to:
receive information from a network for discarding a data packet;
identify a data packet to be transmitted;
determine whether the identified data packet is associated with at least one packet filter of a traffic flow template (TFT); and
discard the identified data packet based on whether the identified data packet is associated with the at least one packet filter of the TFT,
wherein the information indicates that the identified data packet is to be discarded based on an enabled discard function included in a RSVP,
wherein the enabled discard function indicates that the identified data packet is to be discarded when the identified data packet is not associated with the at least one packet filter of the TFT.

28. A computer program product for managing a data flow, comprising:
a non-transitory computer-readable medium comprising code for:
receiving information from a network for discarding a data packet;
identifying a data packet to be transmitted;
determining whether the identified data packet is associated with at least one packet filter of a traffic flow template (TFT); and
discarding the identified data packet based on whether the identified data packet is associated with the at least one packet filter of the TFT.

29. The computer program product of claim 28, wherein the network is a radio access network.

30. The computer program product of claim 28, wherein the information is received via a radio network reservation message, the reservation message identifying at least one radio link flow respectively associated with the at least one packet filter of the TFT.

31. The computer program product of claim 30, wherein the at least one link flow comprises a best effort link flow or a quality of service (QoS) link flow.

32. The computer program product of claim 28, wherein the information indicates that the identified data packet is to be discarded based on a negative packet filter included in the TFT,
wherein the identified data packet is to be discarded when the identified data packet is associated with the negative packet filter.

33. The computer program product of claim 32, wherein all packet filters of the TFT include a field indicating whether a respective packet filter is the negative packet filter.

34. A computer program product for managing a data flow, comprising:
a non-transitory computer-readable medium comprising code for:

receiving information from a network for discarding a data packet;
identifying a data packet to be transmitted;
determining whether the identified data packet is associated with at least one packet filter of a traffic flow template (TFT); and
discarding the identified data packet based on whether the identified data packet is associated with the at least one packet filter of the TFT,
wherein the information is received via a radio network reservation message, the reservation message identifying at least one radio link flow respectively associated with the at least one packet filter of the TFT,
wherein a link flow associated with the identified data packet is deactivated,
wherein the information indicates that the identified data packet is to be discarded based on an enabled attribute included in a radio link packet application, and
wherein the enabled attribute indicates that the identified data packet is to be discarded when the identified data packet is associated with the deactivated link flow identified in the reservation message, or when the identified data packet is associated with a link flow not identified in the reservation message.

35. A computer program product for managing a data flow, comprising:
a non-transitory computer-readable medium comprising code for:
receiving information from a network for discarding a data packet;
identifying a data packet to be transmitted;
determining whether the identified data packet is associated with at least one packet filter of a traffic flow template (TFT); and
discarding the identified data packet based on whether the identified data packet is associated with the at least one packet filter of the TFT,
wherein the information indicates that the identified data packet is to be discarded based on an enabled discard attribute/information element/function included in the TFT,
wherein the enabled discard attribute/information element/function indicates that the identified data packet is to be discarded when the identified data packet is not associated with the at least one packet filter of the TFT.

36. A computer program product for managing a data flow, comprising:
a non-transitory computer-readable medium comprising code for:
receiving information from a network for discarding a data packet;
identifying a data packet to be transmitted;
determining whether the identified data packet is associated with at least one packet filter of a traffic flow template (TFT); and
discarding the identified data packet based on whether the identified data packet is associated with the at least one packet filter of the TFT,
wherein the information indicates that the identified data packet is to be discarded based on an enabled discard function included in a RSVP,
wherein the enabled discard function indicates that the identified data packet is to be discarded when the identified data packet is not associated with the at least one packet filter of the TFT.

37. A method of managing a data flow, comprising:
identifying a data packet to be transmitted;
determining whether the identified data packet is associated with at least one packet filter of a traffic flow template (TFT);
deactivating a link flow associated with the identified data packet based on whether the identified data packet is associated with the at least one packet filter of the TFT; and
providing information to a device to discard the identified data packet associated with the deactivated link flow.

38. A method of managing a data flow, comprising:
identifying a data packet to be transmitted;
determining whether the identified data packet is associated with at least one packet filter of a traffic flow template (TFT);
deactivating a link flow associated with the identified data packet based on whether the identified data packet is associated with the at least one packet filter of the TFT; and
providing information to a device to discard the identified data packet associated with the deactivated link flow,
wherein the information indicates that the identified data packet is to be discarded when the identified data packet is determined not to be associated with the at least one packet filter of the TFT.

39. The method of claim 37, wherein the information is provided to the device via a radio network reservation message, the reservation message identifying at least one radio link flow respectively associated with the at least one packet filter of the TFT.

40. The method of claim 39, wherein the at least one link flow comprises a best effort link flow or a quality of service (QoS) link flow.

41. A method of managing a data flow, comprising:
identifying a data packet to be transmitted;
determining whether the identified data packet is associated with at least one packet filter of a traffic flow template (TFT);
deactivating a link flow associated with the identified data packet based on whether the identified data packet is associated with the at least one packet filter of the TFT; and
providing information to a device to discard the identified data packet associated with the deactivated link flow,
wherein the information is provided to the device via a radio network reservation message, the reservation message identifying at least one radio link flow respectively associated with the at least one packet filter of the TFT,
wherein the information indicates that the identified data packet is to be discarded based on an enabled attribute included in a radio link packet application,
wherein the enabled attribute indicates that the identified data packet is to be discarded when the identified data packet is associated with the deactivated link flow identified in the reservation message, or when the identified data packet is associated with a link flow not identified in the reservation message.

42. A method of managing a data flow, comprising:
identifying a data packet to be transmitted;
determining whether the identified data packet is associated with at least one packet filter of a traffic flow template (TFT);
deactivating a link flow associated with the identified data packet based on whether the identified data packet is associated with the at least one packet filter of the TFT; and
providing information to a device to discard the identified data packet associated with the deactivated link flow, wherein the information indicates that the identified data packet is to be discarded based on an enabled discard function included in a RSVP,
wherein the enabled discard function indicates that the identified data packet is to be discarded when the identified data packet is not associated with the at least one packet filter of the TFT.

43. The method of claim 37, wherein the information indicates that the identified data packet is to be discarded based on a negative packet filter included in the TFT,
wherein the identified data packet is to be discarded when the identified data packet is associated with the negative packet filter.

44. The method of claim 43, wherein all packet filters of the TFT include a field indicating whether a respective packet filter is the negative packet filter.

45. A method of managing a data flow, comprising:
identifying a data packet to be transmitted;
determining whether the identified data packet is associated with at least one packet filter of a traffic flow template (TFT);
deactivating a link flow associated with the identified data packet based on whether the identified data packet is associated with the at least one packet filter of the TFT; and
providing information to a device to discard the identified data packet associated with the deactivated link flow,
wherein the information indicates that the identified data packet is to be discarded based on an enabled discard attribute/information element/function included in the TFT,
wherein the enabled discard attribute/information element/function indicates that the identified data packet is to be discarded when the identified data packet is not associated with the at least one packet filter of the TFT.

46. An apparatus for managing a data flow, comprising:
means for identifying a data packet to be transmitted;
means for determining whether the identified data packet is associated with at least one packet filter of a traffic flow template (TFT);
means for deactivating a link flow associated with the identified data packet based on whether the identified data packet is associated with the at least one packet filter of the TFT; and
means for providing information to a device to discard the identified data packet associated with the deactivated link flow.

47. The apparatus of claim 46, wherein the information is provided to the device via a radio network reservation message, the reservation message identifying at least one radio link flow respectively associated with the at least one packet filter of the TFT.

48. The apparatus of claim 47, wherein the at least one link flow comprises a best effort link flow or a quality of service (QoS) link flow.

49. The apparatus of claim 46, wherein the information indicates that the identified data packet is to be discarded based on a negative packet filter included in the TFT,
wherein the identified data packet is to be discarded when the identified data packet is associated with the negative packet filter.

50. The apparatus of claim 49, wherein all packet filters of the TFT include a field indicating whether a respective packet filter is the negative packet filter.

51. An apparatus for managing a data flow, comprising:
means for identifying a data packet to be transmitted;

means for determining whether the identified data packet is associated with at least one packet filter of a traffic flow template (TFT);
means for deactivating a link flow associated with the identified data packet based on whether the identified data packet is associated with the at least one packet filter of the TFT; and
means for providing information to a device to discard the identified data packet associated with the deactivated link flow,
wherein the information indicates that the identified data packet is to be discarded when the identified data packet is determined not to be associated with the at least one packet filter of the TFT.

52. An apparatus for managing a data flow, comprising:
means for identifying a data packet to be transmitted;
means for determining whether the identified data packet is associated with at least one packet filter of a traffic flow template (TFT);
means for deactivating a link flow associated with the identified data packet based on whether the identified data packet is associated with the at least one packet filter of the TFT; and
means for providing information to a device to discard the identified data packet associated with the deactivated link flow,
wherein the information is provided to the device via a radio network reservation message, the reservation message identifying at least one radio link flow respectively associated with the at least one packet filter of the TFT,
wherein the information indicates that the identified data packet is to be discarded based on an enabled attribute included in a radio link packet application,
wherein the enabled attribute indicates that the identified data packet is to be discarded when the identified data packet is associated with the deactivated link flow identified in the reservation message, or when the identified data packet is associated with a link flow not identified in the reservation message.

53. An apparatus for managing a data flow, comprising:
means for identifying a data packet to be transmitted;
means for determining whether the identified data packet is associated with at least one packet filter of a traffic flow template (TFT);
means for deactivating a link flow associated with the identified data packet based on whether the identified data packet is associated with the at least one packet filter of the TFT; and
means for providing information to a device to discard the identified data packet associated with the deactivated link flow,
wherein the information indicates that the identified data packet is to be discarded based on an enabled discard attribute/information element/function included in the TFT,
wherein the enabled discard attribute/information element/function indicates that the identified data packet is to be discarded when the identified data packet is not associated with the at least one packet filter of the TFT.

54. An apparatus for managing a data flow, comprising:
means for identifying a data packet to be transmitted;
means for determining whether the identified data packet is associated with at least one packet filter of a traffic flow template (TFT);

means for deactivating a link flow associated with the identified data packet based on whether the identified data packet is associated with the at least one packet filter of the TFT; and means for providing information to a device to discard the identified data packet associated with the deactivated link flow, wherein the information indicates that the identified data packet is to be discarded based on an enabled discard function included in a RSVP, wherein the enabled discard function indicates that the identified data packet is to be discarded when the identified data packet is not associated with the at least one packet filter of the TFT.

55. An apparatus for managing a data flow, comprising:
a processing system configured to:
identify a data packet to be transmitted;
determine whether the identified data packet is associated with at least one packet filter of a traffic flow template (TFT);
deactivate a link flow associated with the identified data packet based on whether the identified data packet is associated with the at least one packet filter of the TFT; and
provide information to a device to discard the identified data packet associated with the deactivated link flow.

56. The apparatus of claim 55, wherein the information is provided to the device via a radio network reservation message, the reservation message identifying at least one radio link flow respectively associated with the at least one packet filter of the TFT.

57. The apparatus of claim 56, wherein the at least one link flow comprises a best effort link flow or a quality of service (QoS) link flow.

58. The apparatus of claim 55, wherein the information indicates that the identified data packet is to be discarded based on a negative packet filter included in the TFT,
wherein the identified data packet is to be discarded when the identified data packet is associated with the negative packet filter.

59. The apparatus of claim 58, wherein all packet filters of the TFT include a field indicating whether a respective packet filter is the negative packet filter.

60. An apparatus for managing a data flow, comprising:
a processing system configured to:
identify a data packet to be transmitted;
determine whether the identified data packet is associated with at least one packet filter of a traffic flow template (TFT);
deactivate a link flow associated with the identified data packet based on whether the identified data packet is associated with the at least one packet filter of the TFT; and
provide information to a device to discard the identified data packet associated with the deactivated link flow,
wherein the information indicates that the identified data packet is to be discarded when the identified data packet is determined not to be associated with the at least one packet filter of the TFT.

61. An apparatus for managing a data flow, comprising:
a processing system configured to:
identify a data packet to be transmitted;
determine whether the identified data packet is associated with at least one packet filter of a traffic flow template (TFT);
deactivate a link flow associated with the identified data packet based on whether the identified data packet is associated with the at least one packet filter of the TFT; and
provide information to a device to discard the identified data packet associated with the deactivated link flow,
wherein the information is provided to the device via a radio network reservation message, the reservation message identifying at least one radio link flow respectively associated with the at least one packet filter of the TFT,
wherein the information indicates that the identified data packet is to be discarded based on an enabled attribute included in a radio link packet application,
wherein the enabled attribute indicates that the identified data packet is to be discarded when the identified data packet is associated with the deactivated link flow identified in the reservation message, or when the identified data packet is associated with a link flow not identified in the reservation message.

62. An apparatus for managing a data flow, comprising:
a processing system configured to:
identify a data packet to be transmitted;
determine whether the identified data packet is associated with at least one packet filter of a traffic flow template (TFT);
deactivate a link flow associated with the identified data packet based on whether the identified data packet is associated with the at least one packet filter of the TFT; and
provide information to a device to discard the identified data packet associated with the deactivated link flow,
wherein the information indicates that the identified data packet is to be discarded based on an enabled discard attribute/information element/function included in the TFT,
wherein the enabled discard attribute/information element/function indicates that the identified data packet is to be discarded when the identified data packet is not associated with the at least one packet filter of the TFT.

63. An apparatus for managing a data flow, comprising:
a processing system configured to:
identify a data packet to be transmitted;
determine whether the identified data packet is associated with at least one packet filter of a traffic flow template (TFT);
deactivate a link flow associated with the identified data packet based on whether the identified data packet is associated with the at least one packet filter of the TFT; and
provide information to a device to discard the identified data packet associated with the deactivated link flow,
wherein the information indicates that the identified data packet is to be discarded based on an enabled discard function included in a RSVP,
wherein the enabled discard function indicates that the identified data packet is to be discarded when the identified data packet is not associated with the at least one packet filter of the TFT.

64. A computer program product for managing a data flow, comprising:
a non-transitory computer-readable medium comprising code for:
identifying a data packet to be transmitted;
determining whether the identified data packet is associated with at least one packet filter of a traffic flow template (TFT);

deactivating a link flow associated with the identified data packet based on whether the identified data packet is associated with the at least one packet filter of the TFT; and providing information to a device to discard the identified data packet associated with the deactivated link flow.

65. The computer program product of claim 64, wherein the information is provided to the device via a radio network reservation message, the reservation message identifying at least one radio link flow respectively associated with the at least one packet filter of the TFT.

66. The computer program product of claim 65, wherein the at least one link flow comprises a best effort link flow or a quality of service (QoS) link flow.

67. The computer program product of claim 64, wherein the information indicates that the identified data packet is to be discarded based on a negative packet filter included in the TFT,
wherein the identified data packet is to be discarded when the identified data packet is associated with the negative packet filter.

68. The computer program product of claim 67, wherein all packet filters of the TFT include a field indicating whether a respective packet filter is the negative packet filter.

69. A computer program product for managing a data flow, comprising:
a non-transitory computer-readable medium comprising code for:
identifying a data packet to be transmitted;
determining whether the identified data packet is associated with at least one packet filter of a traffic flow template (TFT);
deactivating a link flow associated with the identified data packet based on whether the identified data packet is associated with the at least one packet filter of the TFT; and
providing information to a device to discard the identified data packet associated with the deactivated link flow,
wherein the information indicates that the identified data packet is to be discarded when the identified data packet is determined not to be associated with the at least one packet filter of the TFT.

70. A computer program product for managing a data flow, comprising:
a non-transitory computer-readable medium comprising code for:
identifying a data packet to be transmitted;
determining whether the identified data packet is associated with at least one packet filter of a traffic flow template (TFT);
deactivating a link flow associated with the identified data packet based on whether the identified data packet is associated with the at least one packet filter of the TFT; and
providing information to a device to discard the identified data packet associated with the deactivated link flow,
wherein the information is provided to the device via a radio network reservation message, the reservation message identifying at least one radio link flow respectively associated with the at least one packet filter of the TFT,
wherein the information indicates that the identified data packet is to be discarded based on an enabled attribute included in a radio link packet application,
wherein the enabled attribute indicates that the identified data packet is to be discarded when the identified data packet is associated with the deactivated link flow identified in the reservation message, or when the identified data packet is associated with a link flow not identified in the reservation message.

71. A computer program product for managing a data flow, comprising:
a non-transitory computer-readable medium comprising code for:
identifying a data packet to be transmitted;
determining whether the identified data packet is associated with at least one packet filter of a traffic flow template (TFT);
deactivating a link flow associated with the identified data packet based on whether the identified data packet is associated with the at least one packet filter of the TFT; and
providing information to a device to discard the identified data packet associated with the deactivated link flow,
wherein the information indicates that the identified data packet is to be discarded based on an enabled discard attribute/information element/function included in the TFT,
wherein the enabled discard attribute/information element/function indicates that the identified data packet is to be discarded when the identified data packet is not associated with the at least one packet filter of the TFT.

72. A computer program product for managing a data flow, comprising:
a non-transitory computer-readable medium comprising code for:
identifying a data packet to be transmitted;
determining whether the identified data packet is associated with at least one packet filter of a traffic flow template (TFT);
deactivating a link flow associated with the identified data packet based on whether the identified data packet is associated with the at least one packet filter of the TFT; and
providing information to a device to discard the identified data packet associated with the deactivated link flow,
wherein the information indicates that the identified data packet is to be discarded based on an enabled discard function included in a RSVP,
wherein the enabled discard function indicates that the identified data packet is to be discarded when the identified data packet is not associated with the at least one packet filter of the TFT.

73. A method of managing a data flow, comprising:
receiving first information from a core network for discarding a data packet;
identifying a link flow associated with the data packet;
transmitting second information for deactivating the identified link flow; and
discarding the identified data packet based on whether the identified data packet is associated with at least one packet filter of a traffic flow template (TFT).

74. The method of claim 73, wherein the first information indicates a reservation identifier associated with the at least one packet filter associated with the identified data packet to be discarded.

75. The method of claim 73, wherein the first information is received via radio bearer signaling between the core network and a radio access network.

76. The method of claim 73, wherein the second information is transmitted to a device via a radio network reservation message, the reservation message identifying at least one radio link flow respectively associated with the at least one packet filter of the TFT.

77. The method of claim 76, wherein the at least one link flow comprises a best effort link flow or a quality of service (QoS) link flow.

78. A method of managing a data flow, comprising:
- receiving first information from a core network for discarding a data packet;
- identifying a link flow associated with the data packet;
- transmitting second information for deactivating the identified link flow; and
- discarding the identified data packet based on whether the identified data packet is associated with at least one packet filter of a traffic flow template (TFT),
- wherein the first information indicates that the identified data packet is to be discarded based on an enabled discard attribute/information element/function included in the TFT,
- wherein the enabled discard attribute/information element/function indicates that the identified data packet is to be discarded when the identified data packet is not associated with the at least one packet filter of the TFT.

79. A method of managing a data flow, comprising:
- receiving first information from a core network for discarding a data packet;
- identifying a link flow associated with the data packet;
- transmitting second information for deactivating the identified link flow; and
- discarding the identified data packet based on whether the identified data packet is associated with at least one packet filter of a traffic flow template (TFT),
- wherein the first information indicates that the identified data packet is to be discarded based on an enabled discard function included in a RSVP,
- wherein the enabled discard function indicates that the identified data packet is to be discarded when the identified data packet is not associated with the at least one packet filter of the TFT.

80. The method of claim 73, wherein the first information indicates that the identified data packet is to be discarded based on a negative packet filter included in the TFT,
- wherein the identified data packet is to be discarded when the identified data packet is associated with the negative packet filter.

81. The method of claim 80, wherein all packet filters of the TFT include a field indicating whether a respective packet filter is the negative packet filter.

82. A method of managing a data flow, comprising:
- receiving first information from a core network for discarding a data packet;
- identifying a link flow associated with the data packet;
- transmitting second information for deactivating the identified link flow; and
- discarding the identified data packet based on whether the identified data packet is associated with at least one packet filter of a traffic flow template (TFT),
- wherein the second information is transmitted to a device via a radio network reservation message, the reservation message identifying at least one radio link flow respectively associated with the at least one packet filter of the TFT,
- wherein the first information indicates that the identified data packet is to be discarded based on an enabled attribute included in a radio link packet application,
- wherein the enabled attribute indicates that the identified data packet is to be discarded when the identified data packet is associated with the deactivated link flow identified in the reservation message, or when the identified data packet is associated with a link flow not identified in the reservation message.

83. An apparatus for managing a data flow, comprising:
- means for receiving first information from a core network for discarding a data packet;
- means for identifying a link flow associated with the data packet;
- means for transmitting second information for deactivating the identified link flow; and
- means for discarding the identified data packet based on whether the identified data packet is associated with at least one packet filter of a traffic flow template (TFT).

84. An apparatus for managing a data flow, comprising:
- at least one processor configured to:
- receive first information from a core network for discarding a data packet;
- identify a link flow associated with the data packet;
- transmit second information for deactivating the identified link flow; and
- discard the identified data packet based on whether the identified data packet is associated with at least one packet filter of a traffic flow template (TFT).

85. A computer program product for managing a data flow, comprising:
- a non-transitory computer-readable medium comprising code for:
- receiving first information from a core network for discarding a data packet;
- identifying a link flow associated with the data packet;
- transmitting second information for deactivating the identified link flow; and
- discarding the identified data packet based on whether the identified data packet is associated with at least one packet filter of a traffic flow template (TFT).

* * * * *